United States Patent [19]
Domeier

[11] Patent Number: 4,575,473
[45] Date of Patent: Mar. 11, 1986

[54] CURABLE POLY(ACRYLATE) MOLDING COMPOSITIONS CONTAINING A THERMOPLASTIC POLYMER LOW PROFILE ADDITIVE

[75] Inventor: Linda A. Domeier, Somerville, N.J.

[73] Assignee: Union Carbide Corporation, Danbury, Conn.

[21] Appl. No.: 498,501

[22] Filed: May 26, 1983

[51] Int. Cl.$^4$ .................. C08K 3/00; C08K 3/04; B32B 27/00; C08F 265/04
[52] U.S. Cl. ..................... 428/290; 264/257; 524/425; 524/426; 524/427; 524/441; 524/445; 524/492; 524/496; 524/504; 524/513; 524/514; 524/533; 524/539; 525/66; 525/301; 525/305
[58] Field of Search ............... 428/288, 290; 264/257; 524/425–427, 492, 496, 504, 513, 514, 533, 539, 441, 445; 525/66, 301, 305

[56] References Cited

U.S. PATENT DOCUMENTS

| | | | |
|---|---|---|---|
| 3,789,051 | 1/1974 | Rees et al. | 260/41 A |
| 3,879,318 | 4/1975 | Forsyth | 525/302 |
| 3,912,685 | 10/1975 | Gintz | 525/218 |
| 4,134,930 | 1/1979 | Kubota | 525/305 |
| 4,327,013 | 4/1982 | Peters | 525/426 |
| 4,414,367 | 11/1983 | Gardner | 525/531 |

FOREIGN PATENT DOCUMENTS

| | | | |
|---|---|---|---|
| 2802360 | 7/1978 | Fed. Rep. of Germany | 525/305 |
| 7307264 | 3/1973 | Japan | 525/305 |

OTHER PUBLICATIONS

C.A. 100-129943 (1984) Sep. 3, 1983, JP58 148792, Ricoh Co. Ltd.
C.A. 96-105387(s) (1982) Nov. 11, 1981, E.P. 39588, Prom et al.
C.A. 82-18181(n) (1975) Aug. 27, 1974, Smith et al., Rohm & Haas Co.
C.A. 80-96804(r) (1974) Oct. 24, 1973, Kawahara et al., J73-79240.
C.A. 66-3392(h) (1967) Oct. 4, 1966, Horst, U.S. Pat. No. 3,276,929.
C.A. 86-73920(k) (1977) Nov. 17, 1976, JP 76132227, Kawahara et al.
C.A. 81-56682(p) (1974) Apr. 2, 1974, Takimoto et al.
U.S. patent application Ser. No. 279,448, filed Jul. 1, 1981 (Domeier) now abandoned.
U.S. patent application Ser. No. 278,902, filed Jun. 29, 1981, now abandoned, Domeier.
U.S. patent application Ser. No. 279,450, filed Jul. 1, 1981, Domeier.
U.S. patent application Ser. No. 279,446, filed Jul. 1, 1981, now abandoned, Gardner.
U.S. patent application Ser. No. 135,906, filed Apr. 14, 1980, now abandoned, Angell.

Primary Examiner—Herbert J. Lilling
Attorney, Agent, or Firm—Morris N. Reinisch

[57] ABSTRACT

This invention is directed to curable molding compositions containing a mixutre of a poly(acrylate), a polymerizable ethylenically unsaturated monomer which serves to crosslink the poly(acrylate) to a thermoset product, and a thermoplastic polymer low profile additive. The curable molding compositions exhibit improved shrink control during the curing reaction. This invention is also directed to fiber reinforced thermoset resin articles which exhibit generally improved surface appearance quality and can be produced by a rapid injection molding process from the curable molding compositions.

19 Claims, No Drawings

CURABLE POLY(ACRYLATE) MOLDING COMPOSITIONS CONTAINING A THERMOPLASTIC POLYMER LOW PROFILE ADDITIVE

BRIEF SUMMARY OF THE INVENTION

Technical Field

This invention is directed to curable molding compositions containing a mixture of a poly(acrylate), a polymerizable ethylenically unsaturated monomer which serves to crosslink the poly(acrylate) to a thermoset product, and a thermoplastic polymer low profile additive. The curable molding compositions exhibit improved shrink control during the curing reaction. This invention is also directed to reinforced thermoset resin articles prepared from these curable molding compositions and containing one or more fibers with a melting point or a glass transition temperature above about 130° C. which exhibit generally improved surface appearance quality. Fiber reinforced thermoset resin articles can be produced from the curable molding compositions of this invention by a very rapid injection molding process which is typically less than about two minutes from the time the cure of the resin mixture is initiated.

Background of the Invention

It is well known that curable polyester resin systems are widely utilized in making fiber reinforced thermoset articles. The polyesters employed in these resin systems are generally the reaction products of a dicarboxylic acid or anhydride with a polyhydric alcohol. Fiber reinforced molding composites based on polyester resins systems have been advantageously employed in both bulk molding compound (BMC) formulations and sheet molding compound (SMC) formulations. A technical improvement that has made a significant contribution to commercial polyester molding technology is the use of low profile additives to reduce shrinkage during the curing reaction and to thereby improve the dimensional stability and surface smoothness of the fiber reinforced thermoset composite.

A further technical improvement that has made a significant contribution to commercial polyester molding technology is the development of chemically thickened polyester resin systems. Chemical thickening is generally always employed in sheet molding compounds (SMC) and is increasingly being used in bulk molding compounds (BMC). In such systems, a metal oxide or hydroxide such as magnesium oxide or magnesium hydroxide is added to, for example, the uncured polyester/low profile additive along with fillers, glass fiber and other standard materials. The metal oxide or hydroxide interacts with residual acidity in the polyester to build viscosity. The thickened system is relatively tack free and easy to handle, and the high viscosity carries the glass fiber reinforcement to the extremities of the mold during crosslinking of the system.

Other thermoset resin systems based on poly(acrylates) have been developed which can be used to prepare fiber reinforced molding composites by rapid injection molding technology. The poly(acrylates) employed in these resin systems are generally prepared by the reaction of acrylic acid or methacrylic acid or their simple esters with a polyhydric alcohol. Poly(acrylate) resin systems generally have a relatively low viscosity so that they can be used to produce thermoset resin articles containing up to about 75 weight percent of reinforcing fibers by a rapid injection molding process. Chemical thickening is not employed in such poly(acrylate) resin systems.

U.S. Pat. No. 4,327,013 describes curable molding compositions which contain a mixture of (a) one or more fibers with a melting point or a glass transition temperature above about 130° C., (b) a poly(acrylate) characterized by the following empirical formula:

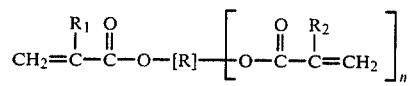

wherein R is the hydroxy-free residue of an organic polyhydric alcohol which contained alcoholic hydroxyl groups bonded to different carbon atoms, $R_1$ and $R_2$ are independently hydrogen or methyl, and n is 1 to 3, (c) an ethylenically unsaturated monomer which is soluble in and copolymerizable with (b), and (d) an elevated temperature free radical curing catalyst capable of affecting the co-reaction of (b) with (c). This patent additionally describes an injection molding process for producing high performance reinforced thermoset molded articles by (i) forming a mixture of the above-described curable molding composition, (ii) providing the mixture into a heatable mold and (iii) molding the mixture at a temperature sufficient to cause the initiation of the co-reaction of (b) with (c) at a temperature not greater than 150° C. and (iv) completing the molding in less than 6 minutes from the time of the initiation of the co-reaction.

Copending U.S. patent application Ser. No. 279,448, filed July 1, 1981, now abandoned describes a curable molding composition containing a mixture of (a) a poly(acrylate) characterized by the following empirical formula:

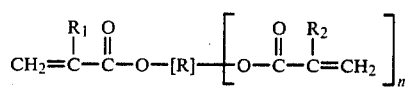

wherein R is the hydroxy-free residue of an organic polyhydric alcohol which contained alcoholic hydroxyl groups bonded to different carbon atoms, $R_1$ and $R_2$ are independently hydrogen or methyl, and n is 1 to 3, (b) acrylic or methacrylic acid or a functionalized derivative thereof having a molecular weight of less than 300 which is different from (a), and (c) an ethylenically unsaturated monomer which is soluble in and copolymerizable with (a) and (b) and which is different from (a) and (b). The compositions can also contain one or more fibers with a melting point or a glass transition temperature above about 130° C. The combination of components in these compositions produce reinforced articles having a particularly good balance of mechanical properties by a very rapid injection mold cycle which is typically less than about 2 minutes from the time the cure of the resin is initiated.

Copending U.S. patent application Ser. No. 278,902, filed June 29, 1981, now abandoned, describes curable molding compositions used for the rapid fabrication of fiber reinforced thermoset resin articles having improved mechanical properties which contain a mixture of (a) a thermosettable organic material containing two or more polymerizable carbon-carbon double bonds which can include a poly(acrylate) characterized by the following empirical formula:

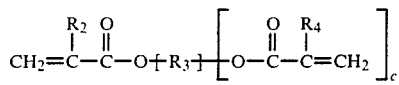

wherein $R_3$ is the hydroxy-free residue of an organic polyhydric alcohol which contained alcoholic hydroxyl groups bonded to different carbon atoms, $R_2$ and $R_4$ are independently hydrogen or methyl, and c is 1 to 3, (b) acrylic or methacrylic acid or a functionalized derivative thereof having a molecular weight of less than 300 which is different from (a), and (c) an ethylenically unsaturated monomer which is soluble in and copolymerizable with (a) and (b) and which is different from (a) and (b). The compositions can also contain one or more fibers with a melting point or a glass transition temperature above about 130° C. The combination of components in these compositions produce reinforced articles having a particularly good balance of mechanical properties by a very rapid injection mold cycle which is typically less than about 2 minutes from the time the cure of the resin is initiated.

Copending U.S. patent application Ser. No. 279,450, filed July 1, 1981, describes curable molding compositions used for the rapid fabrication of fiber reinforced thermoset resin articles having improved mold release characteristics which contain (a) a thermosettable organic material containing two or more polymerizable carbon-carbon double bonds which can include a poly(acrylate) characterized by the following empirical formula:

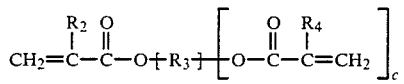

wherein $R_3$ is the hydroxy-free residue of an organic polyhydric alcohol which contained alcoholic hydroxyl groups bonded to different carbon atoms, $R_2$ and $R_4$ are independently hydrogen or methyl, and c is 1 to 3, (b) a monoethylenically unsaturated monomer which forms a liquid homogeneous mixture with and is copolymerizable with (a), and (c) a thermosettable organic material containing two or more polymerizable carbon-carbon double bonds having a cross-link density of greater than (a) and containing allyl, vinyl, acrylic and methacrylic types of carbon-carbon double bonds. This application additionally describes an improved process for rapidly fabricating fiber reinforced thermoset resin articles having improved mold release characteristics in molds having shapes that cause problems in releasing the molded article therefrom.

Copending U.S. patent application Ser. No. 279,446, filed July 1, 1981, now abandoned, describes curable molding compositions used for the rapid fabrication of fiber reinforced thermoset resin articles having improved mechanical properties which contain (a) a thermosettable organic material containing two or more polymerizable carbon-carbon double bonds which can include a poly(acrylate) characterized by the following empirical formula:

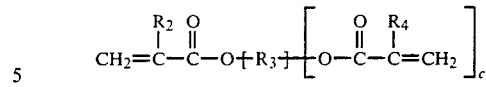

wherein $R_3$ is the hydroxy-free residue of an organic polyhydric alcohol which contained alcoholic groups bonded to different carbon atoms, $R_2$ and $R_4$ are independently hydrogen or methyl, and c is 1 to 3, (b) an ethylenically unsaturated monomer which forms a liquid homogeneous mixture with and is copolymerizable with (a) and is different from (a), and (c) an effective amount of an initiator or a mixture of initiators characterized by a ten-hour half-life temperature, or in the case of a mixture of initiators, an average ten-hour half-life temperature, of greater than about 50° C. and less than 105° C., which produces on decomposition less than 1.0 milliliters of gas per gram of resin as measured at a temperature of 25° C. and a pressure of one atmosphere. This application additionally describes an improved process for rapidly fabricating fiber reinforced thermoset resin articles having improved mechanical properties utilizing the above-described curable molding compositions therein.

While poly(acrylate) resin systems provide for the rapid production of high performance reinforced thermoset resin articles with generally minimal surface requirements such as automotive structural components and the like, it is highly desirable that such reinforced thermoset resin articles have improved surface qualities which will allow the molded article to be used in the rapid production of surface critical articles or parts such as automobile exteriors and the like. It is highly desirable that such surface critical articles or parts have very low profile surfaces which are essentially free of warpage, undulations, fiber prominence or similar defects. There is, therefore, a need to provide curable low profile poly(acrylate) resin systems which exhibit reduced shrinkage during the curing reaction and thereby afford improved surface appearance in the reinforced molded articles obtainable therefrom.

It has been found as a result of the present invention that curable molding compositions containing a poly(acrylate), a polymerizable ethylenically unsaturated monomer which serves to crosslink the poly(acrylate) to a thermoset product, and a thermoplastic polymer low profile additive exhibit improved shrink control during the curing reaction. Reinforced thermoset resin articles containing one or more fibers with a melting point or a glass transition temperature above about 130° C. and prepared from the curable molding compositions of this invention also exhibit generally improved surface appearance quality.

Disclosure of the Invention

The present invention is directed to curable molding compositions comprising a mixture of: (a) a poly(acrylate) characterized by the following empirical formula:

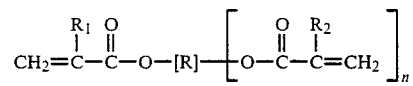

wherein R is the hydroxy-free residue of an organic polyhydric alcohol which contained alcoholic hydroxyl groups bonded to different carbon atoms, $R_1$ and $R_2$ are independently hydrogen or methyl, and n is 1 to 3; (b) an ethylenically unsaturated monomer which is soluble in and copolymerizable with (a); and (c) a thermoplastic polymer low profile additive which is soluble in the mixture of (a) and (b). The curable molding compositions can optionally contain an initiator, a mold release agent, fibers, fillers and other additives. The curable molding compositions exhibit improved shrinkage control during the curing reaction and the reinforced thermoset resin products prepared therefrom exhibit generally improved surface appearance quality in comparison with curable molding compositions and reinforced thermoset resin products prepared therefrom which do not contain a thermoplastic polymer low profile additive as described herein. There is known to be a strong correlation between the cure shrinkage of a curable molding composition and the surface appearance quality of fiber reinforced thermoset resin articles prepared therefrom.

The unfilled curable molding compositions of this invention have a low viscosity, i.e., from about 10 to about 1000 centipoise, preferably less than about 600 centipoise, so that they can be used to produce thermoset resin articles containing up to about 75 weight percent of reinforcing fibers by a very rapid injection molding process. A low curable molding composition viscosity is highly desirable in a rapid injection molding process in order to avoid any movement of the reinforcing fibers during the injection step. The reinforcing fibers have a melting point or a glass transition temperature above about 130° C. and include, for example, fiberglass, carbon fibers, aromatic polyamide fibers, and mixtures thereof. Fiber reinforced thermoset resin articles can be produced from the curable molding compositions of this invention by a very rapid injection molding process which is typically less than two minutes, oftentimes less than one minute, from the time the cure of the resin mixture is initiated. The curable molding compositions do not require the use of thickening agents in the molding technology described herein.

The poly(acrylates) useful in the curable molding compositions of this invention are advantageously compatible or soluble with a large variety of low profile additives. In the rapid fabrication of fiber reinforced thermoset resin articles, it is important that a homogeneous solution or dispersion of poly(acrylate), low profile additive and other ingredients be injected into the molding apparatus in order to provide improved surface appearance properties in the reinforced thermoset articles. A common problem with many polyester resins is the limited solubility of certain low profile additives therein and the tendency of the polyester/low profile additive mixture to separate into two phases.

The curable molding compositions of this invention are particularly suitable for the rapid fabrication of fiber reinforced thermoset having improved surface appearance properties. The fiber reinforced thermoset resin articles prepared from the curable molding compositions can have utility in surface critical molding articles or parts such as automobile exteriors and the like. Surface critical molding articles or parts have very low profile surfaces which are essentially free of warpage, undulations, fiber prominence and similar defects.

The invention is further directed to an improved process for producing a fiber reinforced article which comprises the steps of (a) providing in a heatable matched metal die mold, a bonded web of one or more of said fibers having a melting point or a glass transition temperature above about 130° C., (b) providing in an accumulator zone, a liquid body of a thermosettable organic material which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom, wherein the improvement comprises a resin composition comprising a mixture of: (i) a poly(acrylate) characterized by the following empirical formula:

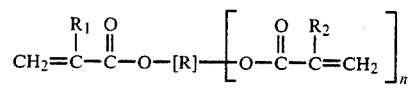

wherein R is the hydroxy-free residue of an organic polyhydric alcohol which contained alcoholic hydroxyl groups bonded to different carbon atoms, $R_1$ and $R_2$ are independently hydrogen or methyl, and n is 1 to 3; (ii) an ethylenically unsaturated monomer which is soluble in and copolymerizable with (i); and (iii) a thermoplastic polymer low profile additive which is soluble in the mixture of (i) and (ii). The fiber reinforced article prepared by the above described process is also a part of this invention as are other fiber reinforced molded articles prepared from the curable molding compositions.

Copending U.S. patent application Ser. No. 498,502, now U.S. Pat. No. 4,487,798, filed on an even date herewith, describes curable molding compositions containing a mixture of a poly(acrylate), a polymerizable ethylenically unsaturated monomer which serves to crosslink the poly(acrylate) to a thermoset product, unsubstituted or substituted meta- and/or para-divinylbenzene, and a thermoplastic polymer low profile additive. The curable molding compositions exhibit improved shrink control during the curing reaction. This application also describes reinforced thermoset resin articles containing one or more fibers with a melting point or a glass transition temperature above about 130° C. which exhibit generally improved surface appearance quality. Fiber reinforced thermoset resin articles can be produced from the curable molding compositions by a very rapid injection molding process which is typically less than about two minutes from the time the cure of the resin mixture in initiated.

In copending U.S. patent application Ser. No. 498,578, filed on an even date herewith, there is described curable molding compositions containing a mixture of a poly(acrylate); a polymerizable ethylenically unsaturated monomer which serves to crosslink the poly(acrylate) to a thermoset product; at least one of the following: (i) a crosslinkable vinyl monomer having a reactivity ratio ($r_1$) with styrene of greater than one, (ii) an epoxy compound having at least one 1,2-epoxy group per molecule, and (iii) an unsaturated fatty acid ester; and a thermoplastic polymer low profile additive. The curable molding compositions exhibit improved shrink control during the curing reaction. This application also describes reinforced thermoset resin articles containing one or more fibers with a melting point or a glass transition temperature above about 130° C. which exhibit generally improved surface appearance quality. Fiber reinforced thermoset resin articles can be produced from the curable molding compositions by a very rapid injection molding process which is typically less than about two minutes from the time the cure of the resin mixture is initiated.

Copending U.S. patent application Ser. No. 498,577, filed on an even date herewith, describes curable molding compositions containing a mixture of a poly(acrylate), a polymerizable ethylenically unsaturated monomer which serves to crosslink the poly(acrylate) to a thermoset product, a thermoplastic polymer low profile additive, and a free radical initiator mixture containing at least one initiator with a 10-hour half-life temperature ($t_{\frac{1}{2}}$) of greater than about 90° C. and at least one initiator with a 10-hour half-life temperature ($t_{\frac{1}{2}}$) of less than about 90° C. The curable molding compositions exhibit improved shrink control during the curing reaction. This application also describes reinforced thermoset resin articles containing one or more fibers with a melting point or a glass transition temperature above about 130° C. which exhibit generally improved surface appearance quality. Fiber reinforced thermoset resin articles can be produced from the curable molding compositions by a very rapid injection molding process which is typically less than about two minutes from the time the cure of the resin mixture is initiated.

In copending U.S. patent application Ser. No. 498,494, now U.S. Pat. No. 4,524,162 filed on an even date herewith, there is described curable molding compositions containing a mixture of a poly(acrylate); a polymerizable ethylenically unsaturated monomer which serves to crosslink the poly(acrylate) to a thermoset product; a crosslinkable vinyl monomer having a reactivity ratio ($r_1$) with styrene of greater than one and at least one of the following: (1) a second crosslinkable vinyl monomer having a reactivity ratio ($r_1$) with styrene of greater than one, (ii) an epoxy compound having at least one 1,2-epoxy group per molecule, and (iii) an unsaturated fatty acid ester; and a thermoplastic polymer low profile additive. The curable molding compositions exhibit improved shrink control during the curing reaction. This application also describes reinforced thermoset resin articles containing one or more fibers with a melting point or a glass transition temperature above about 130° C. which exhibit generally improved surface appearance quality. Fiber reinforced thermoset resin articles can be produced from the curable molding compositions by a very rapid injection molding process which is typically less than about two minutes from the time the cure of the resin mixture is initiated.

Copending U.S. patent application Ser. No. 498,579, filed on an even date herewith, describes curable molding compositions having a viscosity of 1500 centipoise or less and containing a mixture of a thermosettable organic material containing two or more polymerizable carbon-carbon double bonds, a polymerizable ethylenically unsaturated monomer which serves to crosslink the thermosettable organic material to a thermoset product, and a thermoplastic polymer low profile additive. The curable molding compositions exhibit improved shrink control during the curing reaction. This application also describes reinforced thermoset resin articles containing one or more fibers with a melting point or a glass transition temperature above about 130° C. which exhibit generally improved surface appearance quality. Fiber reinforced thermoset resin articles can be produced from the curable molding compositions by a very rapid injection molding process which is typically less than about two minutes from the time the cure of the resin mixture is initiated.

DETAILED DESCRIPTION

The poly(acrylate) or blend of poly(acrylates) suitable for use in the present invention is characterized by the following empirical formula:

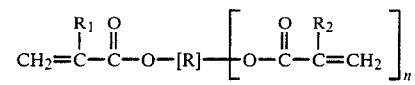

wherein R is the hydroxy-free residue of an organic polyhydric alcohol which contained alcoholic hydroxyl groups bonded to different carbon atoms, $R_1$ and $R_2$ are independently hydrogen or methyl, n is a value of at least 1, preferably a value of from 1 to 3.

The polyhydric alcohol suitable for preparing the poly(acrylate) typically contains at least two carbon atoms and may contain 2 or more hydroxyl groups. These polyhydric alcohols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentanediol, dipropylene glycol, propylene glycol, polypropylene glycol having an average molecular weight of about 150 to about 600, triethylene glycol, 1,4-cyclohexanedimethanol, neopentyl glycol, 2,2-dimethyl-3-hydroxypropyl-2,2-dimethyl-3-hydroxypropionate, polyethylene glycol having an average molecular weight of about 150 to about 600, 2,2-bis[4-(2-hydroxyethoxy)phenyl]propane, 2,2-bis[4-(2-hydroxypropoxy)phenyl]propane, triethanolamine, 1,3-butanediol, tetraethylene glycol, 2,2-bis(4-hydroxyphenyl)propane, glycerine, trimethylolpropane, 1,4-butanediol, the polycaprolactone ester of trimethylolpropane which contains about 1.5 equivalents of caprolactone ester, the polycaprolactone ester of trimethylolpropane which contains about 3.6 equivalents of caprolactone, 2-ethyl-1,3-hexanediol, 1,5-pentanediol, tripropylene glycol, 2,2-bis-(4-hydroxycyclohexyl)propane, 1,2,6-hexane triol, 1,3-propanediol, 1,6-hexanediol and the like. Mixtures of the aforementioned polyols may also be used in this invention.

The poly(acrylate) of the aforementioned organic polyhydric alcohol can be prepared by the reaction of acrylic acid or methacrylic acid or their simple esters with the polyhydric alcohol under conditions well known in the art. Poly(acrylates) produced by the addition of acrylic or methacrylic acid across ethylenically unsaturated bonds may also be used in the practice of this invention.

The preferred poly(acrylates) include one or more of ethoxylated bisphenol A dimethacrylate, tetraethylene glycol dimethacrylate, diethylene glycol dimethacrylate, ethoxylated bisphenol A diacrylate, propoxylated bisphenol A dimethacrylate, propoxylated bisphenol A diacrylate, tetraethylene glycol diacrylate, diethylene glycol diacrylate, ethylene glycol dimethyacrylate, trimethylolpropane triacrylate, and trimethylolpropane trimethacrylate. The poly(acrylate) is present in the curable molding compositions of this invention in an amount of from about 10 to about 75 weight percent, preferably from about 15 to about 50 weight percent.

Unless otherwise indicated, the term "weight percent" used herein refers to the total weight of components (a), (b) and (c) of the curable molding compositions exclusive of other additives such as fillers.

The poly(acrylates) suitable for use in the present invention can be further blended with one or more of the following thermosettable organic materials containing two or more polymerizable carbon-carbon double bonds: (1) an unsaturated polyester; (2) a half-ester of a hydroxyl-terminated polyester; (3) a half-ester of an organic polyol; (4) a vinyl ester resin produced by the addition of an unsaturated monocarboxylic acid to a polyepoxide; (5) a urethane poly(acrylate); (6) an unsaturated isocyanurate; and the like. These materials can be blended with the poly(acrylates) in an amount such that the curable molding compositions remain homogeneous. Suitable thermosettable organic materials which can be blended with the poly(acrylates) are more fully described, for example, in copending U.S. patent application Ser. No. 279,446, filed July 1, 1981, copending U.S. patent application Ser. No. 279,450, filed July 1, 1981, and copending U.S. patent application Ser. No. 278,902, filed June 29, 1981.

Suitable ethylenically unsaturated monomers which may be employed in the practice of this invention are one or more ethylenically unsaturated copolymerizable monomers which are soluble in and copolymerizable with the poly(acrylate). These ethylenically unsaturated monomers contain at least a single $-CH=C<$ group, and preferably a $CH_2=C<$ group and include styrene and its derivatives and homologues, diallylphthalate, triallyl isocyanurate, nonfunctionalized esters of acrylic or methacrylic acid (such as ethyl acrylate, butyl acrylate, and methyl methacrylate), unsaturated nitriles (such as acrylonitrile and methacrylonitrile) and the like. Also included herein are low levels of maleic anhydride.

Other suitable ethylenically unsaturated monomers include acrylic or methacrylic acid or a functionalized derivative thereof having a molecular weight of less than 300 and which is different from the poly(acrylate). Mixtures of these may also be used in this invention. The functionalized derivatives are characterized by the presence of acrylate, methacrylate, acrylamide, and methacrylamide groups and also by the presence of functional groups such as hydroxyl, amino, alkylamino, and epoxide, for example. The molecular weight of these monomers is typically less than 300. Preferred monomers are characterized by the following formula:

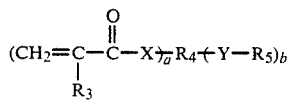

wherein $R_3$ is independently hydrogen or methyl; X and Y are independently $-O-$ or

wherein $R_6$ is hydrogen or lower alkyl; $R_4$ is an aliphatic or aromatic radical containing from 2 to about 10 carbon atoms, optionally containing $-O-$ or

$R_5$ is hydrogen or an aliphatic or aromatic radical containing from 1 to 10 carbon atoms; and a and b are integers of or greater than 1, preferably 1 to 3.

These functionalized derivatives of acrylic or methacrylic acid include 2-hydroxyethyl acrylate, 2-hydroxyethyl methacrylate, hydroxylpropyl acrylate, hydroxypropyl methacrylate, hydroxybutyl acrylate, hydroxybutyl methacrylate, 2-aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethyl acrylamide, 2-aminoethyl methacrylamide, diethylene glycol monoacrylate, diethylene glycol monomethacrylate, 2-methoxyethyl acrylate, 2-methoxyethyl methacrylate, pentaerythritol monoacrylate, pentaerythritol monomethacrylate, pentaerythritol diacrylate, pentaerythritol dimethacrylate, pentaerythritol triacrylate, glycerol monoacrylate, glycerol monomethacrylate, trimethylolpropane monoacrylate, trimethylolpropane monomethacrylate, glycidyl methacrylate, glycidyl acrylate, hydroxymethyl acrylamide and the like, or mixtures thereof. It is understood that several isomers of many of these monomers exist and would be suitable for use herein either as individual components or as mixtures with any of the other monomers. Similarly, it is understood that additional derivatives containing aromatic rings and other alkyl groups in the acid or ester portion of the above formula may also be included.

Preferred functionalized derivatives of acrylic or methacrylic acid employed in the practice of this invention include 2-hydroxyethyl methacrylate, 2-hydroxyethyl acrylate, and hydroxypropyl acrylate.

Mixtures of the aforementioned ethylenically unsaturated monomers may be effectively employed in the practice of this invention. Such mixtures may be advantageous in improving the solubility of the thermoplastic polymer low profile additive in the curable molding compositions of this invention. Preferred ethylenically unsaturated monomer mixtures include styrene and at least one of 2-hydroxyethyl methacrylate, 2-hydroxyethyl acrylate and hydroxypropyl acrylate.

The preferred ethylenically unsaturated monomer contemplated in the practice of this invention is styrene or a mixture of styrene and 2-hydroxyethyl methacrylate. The ethylenically unsaturated monomer is present in the curable molding compositions of this invention in an amount of from about 10 to about 75 weight percent, preferably from about 25 to about 65 weight percent.

An essential component of the curable molding compositions of this invention is a thermoplastic polymer low profile additive. In one aspect, the thermoplastic polymer low profile additives that may be employed in this invention are thermoplastic polymers of vinyl acetate, saturated thermoplastic polyesters, and mixtures of the same. In another aspect of the invention, the thermoplastic polymer low profile additives that may be employed herein are thermoplastic polyalkyl acrylate or methacrylate polymers. In still another aspect of this invention, the thermoplastic polymer low profile additives that may be employed in this invention include homopolymers of styrene and substituted styrene and also copolymers containing styrene. The thermoplastic polymer low profile additives suitable for use in the present invention are soluble in the resin mixture of poly(acrylate) and the ethylenically unsaturated monomer. The resin mixtures useful in the curable molding compositions of this invention are advantageously compatible or soluble with a large variety of low profile additives.

Suitable thermoplastic vinyl acetate polymer low profile additives include poly(vinyl acetate) homopolymers and copolymers containing at least 50 weight percent vinyl acetate. Such polymers include, for example, vinyl acetate homopolymer; carboxylated vinyl acetate polymers including copolymers of vinyl acetate and ethylenically unsaturated carboxylic acids, such as acrylic acid, methacrylic acid, crotonic acid, maleic acid, fumaric acid, itaconic acid and the like or anhydrides such as maleic anhydride; vinyl acetate/vinyl chloride/maleic acid terpolymer, and the like. Reference is made to U.S. Pat. No. 3,718,714 to Comstock, et al. and British Pat. No. 1,361,841 to Comstock, et al. for descriptions of some of the suitable vinyl acetate polymer low profile additives.

The useful vinyl acetate polymer low profile additives ordinarily have molecular weights within the range of from about 10,000 to about 250,000, and preferably from about 25,000 to about 175,000. They are usually employed in the curable molding compositions of this invention in proportions of from about 5 to 25 weight percent, and preferably from about 8 to about 16 weight percent.

Suitable thermoplastic saturated polyester low profile additives are, in general, low molecular weight saturated polymers of polymerizable linear and/or cylic esters and carboxylated saturated polymers of said polymerizable esters having at least one carboxyl group per molecule.

Polymers of linear and/or cyclic esters, including carboxylated polymers having an average of at least one carboxyl group per molecule which may be used in accordance with the present invention are those which possess a reduced viscosity of at least about 0.1, and preferably from about 0.15 to about 15 and higher. The preferred polymers of cyclic esters have a reduced viscosity of from about 0.2 to about 10.

Suitable polymers are further characterized by the following basic recurring structural Unit I

Unit I wherein each $R_7$, which can be the same or different, is hydrogen, halogen, i.e., chlorine, bromine, iodine, or fluorine, or a monovalent hydrocarbon radical generally containing a maximum of 12 carbon atoms, and preferably containing a maximum of eight carbon atoms. A is an oxy group, x is an integer having a value of 1 to 4 inclusive; y is an integer having a value of 1 to 4 inclusive; z is an integer having a value of 0 or 1, with the proviso that (a) the sum of $x+y+z$ is 4 to 6 inclusive and (b) the total number of $R_7$ variables which are substituents other that hydrogen does not exceed 2.

Illustrative of suitable monovalent hydrocarbon radicals for $R_7$ are the following: alkyl radicals such as methyl, ethyl, isopropyl, n-butyl, sec-butyl, t-butyl, n-hexyl, 2-ethylhexyl, n-dodecyl, chloroethyl, chloropropyl and the like; alkoxy radicals such as methoxy, ethoxy, n-propoxy, n-hexoxy, n-dodecoxy and the like; aryl radicals such as phenyl, ethyl phenyl, n-propylphenyl, n-butylphenyl and the like; aryloxy radicals such as phenoxy, n-propylphenoxy, n-butylphenoxy and the like; cycloaliphatic radicals such as cyclopentyl, cyclohexyl and the like.

In one embodiment, desirable polymers of cyclic esters are characterized by both basic recurring structural Unit I supra and basic recurring structural Unit II, as are obtained from a mixture containing a cyclic ester and a cyclic monomer such as ethylene oxide, propylene oxide and the like.

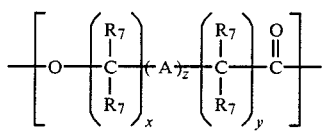

Unit II wherein each $R_8$, is as defined for $R_7$ of Unit I, or in which the two $R_8$ variables together with the ethylene moiety of the oxyethylene chain of Unit II form a saturated cycloaliphatic hydrocarbon ring having from four to eight carbon atoms inclusive. It is preferred that recurring Unit II contains from two to twelve carbon atoms inclusive. The interconnection of Unit I and Unit II does not involve or result in the direct bonding of two oxy groups i.e., —O—O—.

Particularly preferred polymers of cyclic esters are those which are characterized by the oxypentamethylene-carbonyl chain as seen in basic recurring structural Unit III

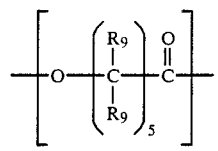

Unit III wherein each $R_9$ is hydrogen or lower alkyl, that is alkyl having a maximum of 4 carbon atoms, with the proviso that no more than three $R_9$ variables are substituents other than hydrogen.

Thermoplastic saturated polymers of linear and/or cyclic esters are well known and the carboxylated saturated esters are well known and such thermoplastic saturated polymers, and particularly polymers prepared from epsilon-caprolactones, have been advantageously employed as low profile additives. Reference, for example, is made to U.S. Pat. Nos. 3,549,586 and 3,668,178 to Comstock et al. for descriptions of thermoplastic saturated polyester low profile additives and carboxylated thermoplastic saturated polyester low profile additives prepared from cyclic esters.

Also included are polyesters based on diacids, such as adipic acid, and diols, such as 1,6-hexanediol. These polyesters are described in, for example, U.S. Pat. Nos. 3,909,483; 3,994,853; 2,736,278; and 3,929,868.

The thermoplastic saturated polyester low profile additives may usually be employed in the curable molding compositions of this invention in proportions similar to those of the thermoplastic vinyl acetate polymers, i.e., in proportions of from about 5 to about 25 weight percent, and preferably from about 8 to about 16 weight percent.

Also suitable in certain aspects of this invention are thermoplastic polyalkyl acrylate or metacrylate low profile additives including, for example, homopolymers of methyl methacrylate, ethyl methacrylate, butyl methacrylate, methyl acrylate, ethyl acrylate; copolymers of methyl methacrylate and lower alkyl esters of acrylic and methacrylic acids; and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, methacrylic acid; polystyrene; styrene copolymers, such as, styrene/butadiene copolymers; cellulose acetate butyrate; alkylene oxide polymers; and the like.

The molecular weight of the alkyl acrylate or methacrylate polymers useful in the invention may vary over a wide range, from 10,000 to 1,000,000, and preferably from 25,000 to 500,000. The thermoplastic polyalkyl acrylate or methacrylate polymer should be present in the curable molding compositions of this invention in amounts ranging from about 1 to about 25 weight percent, and preferably from about 5 to about 20 weight percent.

Particularly suitable in certain aspects of this invention are thermoplastic polymer low profile additives including homopolymers of styrene and substituted styrene and also copolymers containing styrene. Such thermoplastic polymers are generally insoluble in many unsaturated polyester resins. In the resin systems of the present invention, these thermoplastic polymer low profile additives are soluble and form homogeneous molding compositions. The molecular weight of the polystyrene homopolymers or copolymers useful in this invention may vary over a wide range, showing melt flow values of from 1 to 50 grams per 10 minutes. The thermoplastic styrene polymer can be present in the curable molding compositions of this invention in amounts ranging from about 5 to about 25 weight percent and preferably from about 8 to about 16 weight percent.

The most preferred thermoplastic polymer low profile additives employed in the practice of this invention are polystyrene and a copolymer of vinyl acetate and acrylic acid.

A free radical initiator which initiates curing via the co-reaction of the poly(acrylate) and the ethylenically unsaturated monomer can also be included in the curable molding compositions of this invention. These initiators include azo compounds, peroxides, peresters, perketals, and the like including mixtures thereof.

Azo and peroxide initiators are described by, for example, Gallagher et al. "Organic Peroxides Review, Plastics Design and Processing", July 1978, pages 38–42, and August 1978, pages 60–67, inclusive. The technology disclosed in those two articles is incorporated herein by reference. The choice of the specific peroxide or azo initiators or mixtures thereof for the purpose of curing the molding compositions of this invention is within the purview of those having skill in this art and the manner in which such peroxides and azo initiators effect a desirable cure is generally characterized in the aforementioned articles.

Examples of such initiators include 1,1-di-t-butylperoxycyclohexane, 1,1-di-t-butylperoxy-3,3,5-trimethylcyclohexane, 2,2-di-t-butylperoxybutane, 2,2-di-t-butyl-peroxy-4-methyl-pentane, 2,2-dicumylperoxypropane, butyl 2,2-di-t-butylperoxyvalerate, 1,1-bis(2,2,4-trimethylpentyl-2-peroxy)-cyclohexane, 2,2'-azo-bis-isobutyronitrile, dibenzoyl peroxide, lauroyl peroxide, di-t-butyl peroxide, diisopropyl peroxide carbonate, t-butylperoxy-2-ethylhexanoate, t-butyl-perpivalate, 2,5-dimethylhexane-2,5-di-perethylhexanoate, t-butyl peroctoate, t-butyl perneodecanoate, t-butyl perbenzoate, t-butyl percrotonate, t-butyl perisobutyrate, di-t-butyl perphthalate, 1,1-bis(t-butylperoxy)-3,3,5-trimethylcyclohexane, bis(4-t-butyl-cyclohexyl)peroxydicarbonate, methyl ethyl ketone peroxide, 2,4-pentanedione peroxide, bis(t-butylperoxy)diisopropylbenzene, 2,4,4-trimethylpentyl-2-peroxycyclohexane carboxylate, 2-t-butylazo-2-cyano-4-methylpentane, ethyl 3,3-di(butylperoxy)butyrate, and the like. These are commercially available materials.

The peresters and perketals may be used in combination with an acid cure accelerator as described in Netherlands published Patent Application No. 7604405. These acids include Bronsted acids with a $pK_a$ value lower than or equal to that of formic acid, such as hydrochloric acid, sulfuric acid, nitric acid, phosphoric acid, trichloroacetic acid, p-toluenesulfonic acid, and the like. Also, Lewis acids or metal halides with Lewis acid properties, such as boron trifluoride and the chlorides of iron, cobalt, zinc and aluminum may be used.

Additionally, the above described initiators may be used in combination with other cure accelerators such as cobalt compounds. These cobalt compounds include cobalt naphthenate, cobalt-amine cure promoters (such as those designated as PEP 183-S and available from Air Products Incorporated), and the like. These cure accelerators operate by decomposing the curing catalysts at a temperature below their normal activation of decomposition temperature.

Mixtures of the initiators may be used herein, such as mixtures of peresters and/or perketals, of perketals and azo compounds, of peresters and azo compounds, or of an azo compound and a peroxide containing compound.

The concentration of the initiator can be varied within wide limits. As a representative range, the concentration can vary from about 0.25 to about 3.0 weight percent, preferably from about 0.5 to about 2.5 weight percent, and most preferably, from about 0.75 to about 2.0 weight percent, based on the weight of the curable molding composition.

The fibers suitable for use in this invention as reinforcing agents have a melting point or a glass transition temperature above about 130° C. These fibers include fiberglass, carbon fibers, aromatic polyamide fibers (such as aramid fibers sold by E. I. duPont de Nemours Company, Wilmington, Del., under the trademark of Kevlar), metal fibers, such as aluminum and steel fibers, boron fibers, and the like. The carbon fibers include those having a high Young's modulus of elasticity and high tensile strength. These carbon fibers may be produced from pitch as described in U.S. Pat. Nos. 3,976,729, 4,005,183 and 4,026,788, for example. The fibers suitable for use in this invention preferably have a length of at least ¼ inch and an average length of at least ½ inch. Fibers with different lengths exceeding ¼ inch may be used provided that at least about 50 percent of the fibers have lengths greater than ½ inch. Preferred fiber lengths are from 1 to 2 or more inches. Continuous filaments may also be used. It is also within the scope of this invention to include the use of fiber reinforcements of shorter lengths and also fillers such as milled glass.

The preferred fibers are fiberglass, carbon fibers, aromatic polyamide fibers, and mixtures thereof. The molded article contains from about 10 to about 75 weight percent, preferably from about 15 to about 60 weight percent of the reinforcement fiber therein or from about 20 to about 40 weight percent of milled glass reinforcement.

It is furthermore desirable to utilize a vinyl polymerization inhibitor in those cases where the curable molding composition is to be stored and/or shipped. Suitable vinyl polymerization inhibitors are hydroquinone, parabenzoquinone, t-butyl catechol, quinhydrone, toluhydroquinone, mono-t-butyl hydroquinone, 2,5-di-t-butylhydroquinone, hydroquinone monomethyl ether, the biphenol derivatives described in U.S. Pat. No. 4,158,027, and the like. The amount of inhibitor for the purpose of preventing vinyl polymerization can be that conventionally used, namely from about 100 to about 1000 ppm of the total weight of the curable molding composition.

An optional component of the curable molding compositions of this invention is a viscosity reducing agent. In one aspect the invention employs, generally in combination with thermoplastic vinyl acetate polymer low profile additives and thermoplastic saturated polyester low profile additives, a viscosity reducing agent which is an aliphatic monocarboxylic acid having at least 6 carbon atoms.

The aliphatic monocarboxylic acid employed usually has at least 6 carbon atoms in the chain, and is frequently a saturated or unsaturated fatty acid having from 6 to 24 or more carbon atoms in the chain. Such carboxylic acids may be caproic (hexanoic), caprylic (octanoic), capric ($C_{10}$), lauric ($C_{12}$), myristic ($C_{14}$), palmitic ($C_{16}$), palmitoleic ($C_{16}$), stearic ($C_{18}$), oleic ($C_{18}$), linoleic ($C_{18}$), lineolenic ($C_{18}$), and the like acids, and the acids may be either straight chain or branched chain. The viscosity reducing agent can be present in the curable molding compositions of this invention in amounts ranging from about 0.4 to about 6 weight percent, and preferably from about 1 to about 4 weight percent.

The curable molding compositions of this invention may also contain one or more of the known types of conventional additives, which are employed for their known purposes in the usual amounts. Illustrative of such additives are mold release agents or lubricants, pigments, fillers such as clay, hydrated alumina, silica, calcium carbonate and others known to the art, and the like. These additives can be dissolved or dispersed in the curable molding compositions to form a uniform mixture.

The curable molding compositions of this invention are prepared by solution blending a poly(acrylate), an ethylenically unsaturated monomer, a thermoplastic polymer low profile additive, a free-radical curing agent and any other optional ingredients at ambient temperature. Insoluble additives such as calcium carbonate filler can be effectively dispersed in the curable molding compositions. This mixture constitutes the "resin portion" which is a term used herein.

The fiber reinforced molded articles of this invention can be prepared by injecting the resin portion into a bed of one or more of the fibers at a temperature of from about 120° to about 150° C. and pressure of from about 100 to 6000 psi. The upper limit of pressure is dependent upon the clamping characteristics of the press. When the poly(acrylate) and ethylenically unsaturated monomer are copolymerized, a "networklike" copolymer is produced which, in combination with the fiber reinforcement, possess superior strength properties. The resulting fiber reinforced molded article also exhibits improved surface appearance resulting from the shrink controlling action of the thermoplastic polymer low profile additive.

A unique aspect of this invention is that an extremely rapid cure of the molding composition is achieved to produce a molded product. This rapid cure is achieved by heating the molding composition to a temperature which is sufficient to cause the initiation of the co-reaction of the poly(acrylate) and the ethylencially unsaturated monomer. This rapid cure results in completion of the molding operation, in less than about 2 minutes from the time the co-reaction is initiated.

The rapid process for making high performance reinforced thermoset molded articles comprises forming a mixture of (a) one or more fibers with a melting point or a glass transition temperature above about 130° C., and (b) the resin portion as described above. The mixture is provided into a heatable mold and molding of the mixture is effected at a temperature sufficient to cause the initiation of the co-reaction of the poly(acrylate) with the ethylenically unsaturated monomer at a temperature not greater than 150° C. and the completion of molding in less than 2 minutes from the time of initiation of said co-reaction.

A preferred process for such rapid fabrication of a fiber reinforced molded article from the curable molding compositions of this invention is described in U.S. patent application Ser. No. 135,906 entitled "Molding Process and Apparatus Therefore," and filed on Apr. 14, 1980, now abandoned, in the name of R. Angell, Jr., which is incorporated herein by reference. In said process, the fiber reinforcement is comprised of one or more fibers with a melting point or a glass transition temperature above about 130° C. The process comprises the steps of (a) providing in a heatable matched metal die mold, a bonded web of one or more of said fibers, (b) providing in an accumulator zone, a liquid body of a thermosettable organic material which is curable upon heating to a thermoset resin composition, the viscosity of said liquid body being maintained essentially constant in the accumulator zone by keeping its temperature below that at which curing of said materials is substantial, (c) closing said mold containing said web, (d) injecting a least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, an (f) opening said mold and removing the cured thermoset article therefrom.

The preferred apparatus for use in preparing fiber reinforced molded articles from curable molding compositions in accordance with this invention is also described in U.S. patent application Ser. No. 135,906, filed Apr. 14, 1980. The apparatus is described as comprising: (a) a heatable matched metal die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, and (d) cooling means associated with the means for controlling the injection of such liquid to such cavities, whereby the temperature of the liquid in such injection means is maintained substantially below the temperature of the mold.

The following examples are illustrative of the present invention and are not intended as a limitation upon the scope thereof. The non-reinforced cured castings and cured glass reinforced composites were prepared and evaluated according to the following procedures.

Cure Shrinkage: determined by measuring the change in density between the liquid resin mixture prior to cure and a non-reinforced solid casting after cure. The castings were prepared by the preferred rapid fabrication molding process described hereinabove except that no reinforcement was contained in the mold. The density of the uncured liquid resin mixture was determined by measuring the liquid resin mixture weight in a tared volumetric flask. The liquid resin mixture was equilibrated in a 25° C. bath before weighing. The density of the cured solid casting was determined by breaking the solid casting by hand into smaller fragments which were weighed on a triple beam balance. The same fragments were then suspended in water and weighed on a triple beam balance (a thin wire platform was suspended from the triple beam balance, tared in water and the casting fragments were then placed on the platform and weighed). The volume of the cured solid casting was determined as the water displaced or $$V = W_{dry\ solid} - W_{solid\ in\ water}$$

and the density of the cured solid casting as $$d_{solid} = W_{dry\ solid}/V$$

The cure shrinkage in percent was determined as $$\text{Percent Cure Shrinkage} = \frac{d_{solid} - d_{liquid}}{d_{solid}} \times 100$$

The abbreviations used above have the indicated meanings: d=density; W=weight and V=volume.

Surface Appearance: determined visually by comparing the surface of a cured glass reinforced composite of this invention with the surface of a control cured glass reinforced composite. Improved surface appearance of the cured glass reinforced composites of this invention was manifested in any of several ways such as the absence or reduction of warpage, undulations, reflected image waviness, fiber prominence or similar defects in comparison with the surface appearance of the control cured glass reinforced composites.

Viscosity: determined in a Brookfield model LVF viscometer using a #3 spindle or a #4 spindle at 60 revolutions per minute. The curable resin systems were equilibrated at 25° C. before measuring the viscosity.

EXAMPLE 1

Into a 10 inch × 5½ inch × 1/10 inch constant volume mold preheated to 140° C. was injected a resin portion containing a mixture of 50 parts by weight of ethoxylated bisphenol A dimethacrylate, 50 parts by weight of styrene, 25 parts by weight of BAKELITE LP-40A which is a thermoplastic copolymer low profile additive of vinyl acetate and acrylic acid (40 weight percent) dissolved in styrene (60 weight percent) commercially available from Union Carbide Corporation, Danbury, Conn., 0.63 parts by weight of Zelec UN mold release which is an organophosphate mold release commercially available for E. I. duPont de Nemours, Wilmington, Del., and 1.88 parts by weight of Trigonox 29-B75 initiator which is 1,1-di-t-butylperoxy-3-3,5-trimethylcyclohexane commercially available from Noury Chemical Corporation, Burt, N.Y. The curable resin portion had a viscosity at 25° C. of 38 centipoise. The Zelec UN mold release constituted 0.5 parts per hundred parts of the resin portion and the Trigonox 29-B75 initiator constituted 1.5 parts per hundred parts of the resin portion. The constant volume mold was closed and evacuated for about 5 seconds prior to injection of the resin portion. The resin portion was injected into the mold at a pressure of 300 pounds per square inch and this injection pressure was maintained for a dwell period of 5 to 20 seconds. After 45 to 160 seconds, the cured casting was removed from the mold. The average cure shrinkage of this resin system was determined to be 5.7 percent. The cured casting was white and opaque in appearance

EXAMPLE 2

The preparation of the resin system and cured casting in Example 1 was repeated with the exception that the following ingredients were used in the following amounts:

| Ethoxylated bisphenol A dimethacrylate | 50 parts by weight |
|---|---|
| Styrene | 50 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 5.1 percent. The curable resin system had a viscosity at 25° C. of 92 centipoise and the cured casting was white and opaque in appearance.

EXAMPLE 3

The preparation of the resin system and cured casting in Example 1 was repeated with the exception that the following ingredients were used in the following amounts:

| Ethoxylated bisphenol A dimethacrylate | 50 parts by weight |
|---|---|
| Styrene | 50 parts by weight |
| BAKELITE LP-40A | 67 parts by weight |
| Zelec UN mold release | 0.84 parts by weight |
| Trigonox 29-B75 initiator | 2.51 parts by weight |

The average cure shrinkage of this resin system was determined to be 6.2 percent. The curable resin system had a viscosity at 25° C. of 186 centipoise and the cured casting was white and opaque in appearance.

EXAMPLE 4

The preparation of the resin system and cured casting in Example 1 was repeated with the exception that the following ingredients were used in the following amounts:

| | |
|---|---|
| Ethoxylated bisphenol A dimethacrylate | 60 parts by weight |
| Styrene | 40 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 5.1 percent. The curable resin system had a viscosity at 25° C. of 143 centipoise and the cured casting was white and opaque in appearance.

EXAMPLE 5

The preparation of the resin system and cured casting in Example 1 was repeated with the exception that the following ingredients were used in the following amounts:

| | |
|---|---|
| Ethoxylated bisphenol A dimethacrylate | 60 parts by weight |
| Styrene | 40 parts by weight |
| BAKELITE LP-40A | 67 parts by weight |
| Zelec UN mold release | 0.84 parts by weight |
| Trigonox 29-B75 initiator | 2.51 parts by weight |

The average cure shrinkage of this resin system was determined to be 4.5 percent. The curable resin system had a viscosity at 25° C. of 276 centipoise and the cured casting was white and opaque in appearance.

EXAMPLE 6

The preparation of the resin system and cured casting in Example 1 was repeated with the exception that the following ingredients were used in the following amounts:

| | |
|---|---|
| Ethoxylated bisphenol A dimethacrylate | 70 parts by weight |
| Styrene | 30 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 6.9 percent. The curable resin system had a viscosity at 25° C. of 270 centipoise and the cured casting was white and opaque in appearance.

EXAMPLE 7

The preparation of the resin system and cured casting in Example 1 was repeated with the exception that the following ingredients were used in the following amounts:

| | |
|---|---|
| Ethoxylated bisphenol A dimethacrylate | 70 parts by weight |
| Styrene | 30 parts by weight |
| BAKELITE LP-40A | 67 parts by weight |
| Zelec UN mold release | 0.84 parts by weight |
| Trigonox 29-B75 initiator | 2.51 parts by weight |

The average cure shrinkage of this resin system was determined to be a 4.2 percent. The curable resin system had a viscosity at 25° C. of 424 centipoise and the cured casting was white and opaque in appearance.

EXAMPLE 8

The preparation of the resin system and cured casting in Example 1 was repeated with the exception that the following ingredients were used in the following amounts:

| | |
|---|---|
| Trimethylolpropane triacrylate | 50 parts by weight |
| Styrene | 50 parts by weight |
| BAKELITE LP-40A | 25 parts by weight |
| Zelec UN mold release | 0.63 parts by weight |
| Trigonox 29-B75 initiator | 1.88 parts by weight |

The average cure shrinkage of this resin system was determined to be 4.3 percent. The cured casting was white and opaque in appearance.

EXAMPLE 9

The preparation of the resin system and cured casting in Example 1 was repeated with the exception that the following ingredients were used in the following amounts:

| | |
|---|---|
| Trimethylolpropane triacrylate | 50 parts by weight |
| Styrene | 50 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 4.9 percent. The cured casting was white and opaque in appearance.

EXAMPLE 10

The preparation of the resin system and cured casting in Example 1 was repeated with the exception that the following ingredients were used in the following amounts:

| | |
|---|---|
| Ethylene glycol dimethacrylate | 50 parts by weight |
| Styrene | 50 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 6.0 percent. The cured casting was white and opaque in appearance.

EXAMPLE 11

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Trimethylolpropane triacrylate | 10 parts by weight |
| Styrene | 40 parts by weight |
| BAKELITE LP-40A | 43 parts by weight |
| Zelec UN mold release | 0.72 parts by weight |
| Trigonox 29-B75 initiator | 2.15 parts by weight |

P The average cure shrinkage of this resin system was determined to be 6.6 percent. The curable resin system had a viscosity at 25° C. of 84 centipoise and the cured casting was white and opaque in appearance.

EXAMPLE 12

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Trimethylolpropane trimethacrylate | 10 parts by weight |
| Styrene | 40 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 4.1 percent. The curable resin system had a viscosity at 25° C. of 74 centipoise and the cured casting was white and opaque in appearance.

EXAMPLE 13

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Trimethylolpropane triacrylate | 15 parts by weight |
| Styrene | 35 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 7.5 percent. The curable resin system had a viscosity at 25° C. of 108 centipoise and the cured casting was white and opaque in appearance.

EXAMPLE 14

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Trimethylolpropane trimethacrylate | 15 parts by weight |
| Styrene | 35 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 2.9 percent. The curable resin system had a viscosity at 25° C. of 84 centipoise and the cured casting was white and opaque in appearance.

EXAMPLE 15

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Trimethylolpropane triacrylate | 20 parts by weight |
| Styrene | 30 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 5.5 percent. The curable resin system had a viscosity at 25° C. of 74 centipoise and the cured casting was white and opaque in appearance.

EXAMPLE 16

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Trimethylolpropane trimethacrylate | 20 parts by weight |
| Styrene | 30 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 3.8 percent. The curable resin system had a viscosity at 25° C. of 108 centipoise and the cured casting was white and opaque in appearance.

EXAMPLE 17

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Dipentaerythritol pentacrylate | 10 parts by weight |
| Styrene | 40 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 3.4 percent. The curable resin system had a viscosity at 25° C. of 162 centipoise and the cured casting was white and opaque in appearance.

EXAMPLE 18

The preparation of the resin system and cured casting in Example 1 was repeated with the exception that the following ingredients were used in the following amounts:

| | |
|---|---|
| Trimethylolpropane triacrylate | 50 parts by weight |
| Hydroxyethyl methacrylate | 22 parts by weight |
| Styrene | 28 parts by weight |
| BAKELITE LP-40A | 25 parts by weight |
| Zelec UN mold release | 0.63 parts by weight |
| Trigonox 29-B75 initiator | 1.88 parts by weight |

The average cure shrinkage of this resin system was determined to be 5.2 percent. The cured casting was white and opaque in appearance.

EXAMPLE 19

The preparation of the resin system and cured casting in Example 1 was repeated with the exception that the following ingredients were used in the following amounts:

| | |
|---|---|
| Trimethylolpropane triacrylate | 50 parts by weight |
| Hydroxyethyl methacrylate | 22 parts by weight |
| Styrene | 28 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 7.5 percent. The cured casting was white and opaque in appearance.

EXAMPLE 20

The preparation of the resin system and cured casting in Example 1 was repeated with the exception that the following ingredients were used in the following amounts:

| | |
|---|---|
| Ethylene glycol dimethacrylate | 50 parts by weight |
| Hydroxyethyl methacrylate | 22 parts by weight |
| Styrene | 28 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 4.9 percent. The cured casting was white and opaque in appearance.

EXAMPLE 21

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Trimethylolpropane triacrylate | 10 parts by weight |
| Hydroxyethyl methacrylate | 20 parts by weight |
| Styrene | 20 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 6.9 percent. The curable resin system had a viscosity at 25° C. of 204 centipoise and the cured casting was white and opaque in appearance.

EXAMPLE 22

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Trimethylolpropane trimethacrylate | 10 parts by weight |
| Hydroxyethyl methacrylate | 20 parts by weight |
| Styrene | 20 parts by weight |
| BAKELITE LP-40A | 43 parts by weight |
| Zelec UN mold release | 0.72 parts by weight |
| Trigonox 29-B75 initiator | 2.15 parts by weight |

The average cure shrinkage of this resin system was determined to be 5.8 percent. The curable resin system had a viscosity at 25° C. of 200 centipoise and the cured casting was white and opaque in appearance.

EXAMPLE 23

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Ethylene glycol dimethacrylate | 15 parts by weight |
| Hydroxyethyl methacrylate | 20 parts by weight |
| Styrene | 15 parts by weight |
| LPA Solution 210 | 43 parts by weight |
| Zelec UN mold release | 0.72 parts by weight |
| Trigonox 29-B75 initiator | 2.15 parts by weight |

LPA Solution 210 is a solution of 40 weight percent polystyrene PS-210 commercially available from Shell Oil Company, Houston, Tex., and 60 weight percent styrene.

The average cure shrinkage of this resin system was determined to be 6.7 percent. The curable resin system had a viscosity at 25° C. of 214 centipoise and the cured casting was white and opaque in appearance.

EXAMPLE 24

The preparation of the resin system and cured casting in Example 1 was repeated with the exception that the following ingredients were used in the following amounts:

| | |
|---|---|
| Ethoxylated bisphenol A dimethacrylate | 50 parts by weight |
| Ethylene glycol dimethacrylate | 10 parts by weight |
| Hydroxyethyl methacrylate | 10 parts by weight |
| Styrene | 30 parts by weight |
| LPA Solution 210 | 43 parts by weight |
| Zelec UN mold release | 0.72 parts by weight |
| Trigonox 29-B75 initiator | 2.15 parts by weight |

The average cure shrinkage of this resin system was determined to be 7.7 percent. The curable resin system had a viscosity at 25° C. of 256 centipoise and the cured casting was white and opaque in appearance.

COMPARATIVE EXAMPLE A

The preparation of the resin system and cured casting in Example 1 was repeated with the exception that a thermoplastic polymer low profile additive was not included in the resin system and the following ingredients were used in the following amounts:

| | |
|---|---|
| Ethoxylated bisphenol A dimethacrylate | 50 parts by weight |
| Styrene | 50 parts by weight |
| Zelec UN mold release | 0.50 parts by weight |

| | |
|---|---|
| Trigonox 29-B75 initiator | 1.50 parts by weight |

The average cure shrinkage of this resin system was determined to be 11.1 percent. The curable resin system had a viscosity at 25° C. of 8 centipoise and the cured casting was a golden color and transparent in appearance.

COMPARATIVE EXAMPLE B

The preparation of the resin system and cured casting in Example 1 was repeated with the exception that a thermoplastic polymer low profile additive was not included in the resin system and the following ingredients were used in the following amounts:

| | |
|---|---|
| Ethoxylated bisphenol A dimethacrylate | 50 parts by weight |
| Hydroxyethyl methacrylate | 22 parts by weight |
| Styrene | 28 parts by weight |
| Zelec UN mold release | 0.50 parts by weight |
| Trigonox 29-B75 initiator | 1.50 parts by weight |

The average cure shrinkage of this resin system was determined to be 11.4 percent. The curable resin system had a viscosity at 25° C. of 12 centipoise and the cured casting was a golden color and transparent in appearance.

COMPARATIVE EXAMPLE C

The preparation of the resin system and cured casting in Example 1 was repeated with the exception that a thermoplastic polymer low profile additive was not included in the resin system and the following ingredients were used in the following amounts:

| | |
|---|---|
| Ethoxylated bisphenol A dimethacrylate | 35 parts by weight |
| Trimethylolpropane triacrylate | 15 parts by weight |
| Hydroxyethyl methacrylate | 22 parts by weight |
| Styrene | 28 parts by weight |
| Zelec UN mold release | 0.50 parts by weight |
| Trigonox 29-B75 initiator | 1.50 parts by weight |

The average cure shrinkage of this resin system was determined to be 12.1 percent. The curable resin system had a viscosity at 25° C. of 8 centipoise and the cured casting was a golden color and transparent in appearance.

The resin systems of Examples 1 through 24 containing a thermoplastic polymer low profile additive as an essential ingredient therein exhibited improved cure shrinkage control in comparison with the resin systems of Comparative Examples A through C in which a thermoplastic polymer low profile additive was not included as an essential ingredient therein.

The following examples illustrate the preparation of reinforced composites from the molding compositions of this invention.

EXAMPLE 25

The preparation of the resin system and molding procedure in Example 2 was repeated with the exception that approximately 42 grams of OCF M-8608 swirl glass mat commercially available from Owens-Corning Fiberglas Corporation, Toledo, Ohio, was placed in the 10 inch×5½ inch×1/10 inch constant volume mold prior to closing, evacuating and injecting the mold. The injection time was 6 seconds and the injection pressure of 300 pounds per square inch was maintained for a dwell period of 10 seconds. After 85 seconds following injection, the resulting cured glass reinforced composite containing about 34 weight percent glass was removed from the mold. The cured glass reinforced composite was white and opaque in appearance.

COMPARATIVE EXAMPLE D

The preparation of the resin system and molding procedure in Comparative Example A was repeated with the exception that approximately 42 grams of OCF M-8608 swirl glass mat was placed in the 10 inch×5½ inch×1/10 inch constant volume mold prior to closing, evacuating and injecting the mold. The injection time was 8 seconds and the injection pressure of 300 pounds per square inch was maintained for a dwell period of 10 seconds. After 85 seconds following injection, the resulting cured glass reinforced composite containing about 35 weight percent glass was removed from the mold. The cured glass reinforced composite was a golden color and transparent in appearance.

The cured glass reinforced composite of Example 25 exhibited generally improved surface appearance in comparison with the surface appearance of the cured glass reinforced composite of Comparative Example D in which a thermoplastic polymer low profile additive was not included therein.

I claim:

1. A curable molding composition suitable for the preparation of fiber reinforced molded articles by a rapid cure rate, injection molding process, consisting essentially of a mixture of:
   (a) from about 10 to about 75 weight percent of a poly(acrylate) characterized by the following empirical formula:

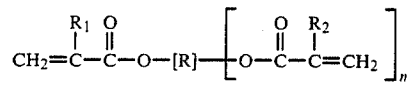

wherein R is the hydroxy-free residue of an organic polyhydric alcohol which contained alcoholic hydroxyl groups bonded to different carbon atoms, $R_1$ and $R_2$ are independently hydrogen or methyl, and n is 1 to 3;
   (b) from about 10 to about 75 weight percent of an ethylenically unsaturated monomer which is soluble in and copolymerizable with (a); and
   (c) from about 5 to about 25 weight percent of a thermoplastic polymer low profile additive which is soluble in the mixture of (a) and (b),
said components (a), (b) and (c) being selected such that said curable molding composition has a viscosity of from about 10 to 1000 centipoise.

2. A curable molding composition as defined in claim 1 wherein the poly(acrylate) is selected from one or more of the following: ethoxylated bisphenol A dimethacrylate, ethoxylated bisphenol A diacrylate, propoxylated bisphenol A dimethacrylate, propoxylated bisphenol A diacrylate, tetraethylene glycol dimethacrylate, diethylene glycol dimethacrylate, tetraethylene glycol diacrylate, diethylene glycol diacrylate, ethylene glycol dimethacrylate, trimethylolpropane triacrylate, and trimethylolpropane trimethacrylate.

3. A curable molding composition as defined in claim 1 wherein the poly(acrylate) is blended with at least one other thermosettable organic material containing two or more polymerizable carbon-carbon double bonds.

4. A curable molding composition as defined in claim 1 wherein the ethylenically unsaturated monomer comprises styrene.

5. A curable molding composition as defined in claim 1 wherein the ethylenically unsaturated monomer comprises a mixture of styrene and 2-hydroxyethyl methacrylate.

6. A curable molding composition as defined in claim 1 wherein the thermoplastic polymer low profile additive is selected from thermoplastic polymers of vinyl acetate, saturated polyesters, polyalkyl acrylates or methacrylates, polystyrene or mixtures or copolymers thereof.

7. A curable molding composition as defined in claim 1 wherein the thermoplastic polymer low profile additive comprises a carboxylated vinyl acetate polymer or polystyrene.

8. A curable molding composition as defined in claim 7 wherein the carboxylated vinyl acetate polymer is a copolymer of vinyl acetate and an ethylenically unsaturated carboxylic acid selected from acrylic acid, methacrylic acid, maleic acid, fumaric acid, and itaconic acid.

9. A curable molding composition as defined in claim 7 wherein the carboxylated vinyl acetate polymer is a copolymer of vinyl acetate and acrylic acid.

10. A curable molding composition as defined in claim 1 further comprising a free radical initiator or a mixture of initiators.

11. A curable molding composition as defined in claim 1 further comprising a filler selected from calcium carbonate, clay, hydrated alumina, silica and mixtures thereof.

12. A molded article prepared from the composition of claim 1.

13. A molded article as defined in claim 12 which contains from about 10 to about 75 weight percent of one or more fibers having a melting point or a glass transition temperature above about 130° C.

14. A molded article as defined in claim 13 wherein the fiber is selected from fiberglass, carbon fibers, aromatic polyamide fibers, and mixtures thereof.

15. A molded article prepared from the composition of claim 11.

16. A molded article as defined in claim 15 which contains from about 10 to about 75 weight percent of one or more fibers having a melting point or a glass transition temperature above about 130° C.

17. A molded article as defined in claim 16 wherein the fiber is selected from fiberglass, carbon fibers, aromatic polyamide fibers, and mixtures thereof.

18. An improved process for producing a fiber reinforced article which comprises the steps of (a) providing in a heatable matched metal die mold, a bonded web of one or more of said fibers having a melting point or a glass transition temperature above about 130° C., (b) providing in an accumulator zone, a liquid body of a thermosettable organic material which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom, wherein the improvement comprises a resin composition consisting essentially of a mixture of:

(i) from about 10 to about 75 weight percent of a poly(acrylate) characterized by the following empirical formula:

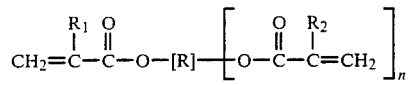

wherein R is the hydroxy-free residue of an organic polyhydric alcohol which contained alcoholic hydroxyl groups bonded to different carbon atoms, $R_1$ and $R_2$ are independently hydrogen or methyl, and n is 1 to 3;

(ii) from about 10 to about 75 weight percent of an ethylenically unsaturated monomer which is soluble in and copolymerizable with (i); and (iii) from about 5 to about 25 weight percent of a thermoplastic polymer low profile additive which is soluble in the mixture of (i) and (ii), said components (i), (ii) and (iii) being selected such that said curable molding composition has a viscosity of from about 10 to 1000 centipoise.

19. The fiber reinforced article prepared from the process of claim 18.

* * * * *